(12) United States Patent
Miller et al.

(10) Patent No.: US 7,303,700 B2
(45) Date of Patent: Dec. 4, 2007

(54) METHODS OF MAKING OPTICALLY CLEAR STRUCTURAL LAMINATES

(75) Inventors: Michael C. Miller, Chandler, AZ (US); Timothy J. Krey, Phoenix, AZ (US); Donald J. Bridges, Mesa, AZ (US); James L. Melquist, Tempe, AZ (US)

(73) Assignee: The Boeing Company, Chicago, IL (US)

( * ) Notice: Subject to any disclaimer, the term of this patent is extended or adjusted under 35 U.S.C. 154(b) by 375 days.

(21) Appl. No.: 10/931,781

(22) Filed: Aug. 31, 2004

(65) Prior Publication Data

US 2005/0042457 A1  Feb. 24, 2005

Related U.S. Application Data

(62) Division of application No. 10/259,702, filed on Sep. 27, 2002, now Pat. No. 6,818,306.

(51) Int. Cl.
*B32B 37/14* (2006.01)
*C08K 9/06* (2006.01)
*C08L 63/00* (2006.01)

(52) U.S. Cl. .................. 264/1.7; 427/162; 427/163.1; 427/407.3; 428/413; 428/417; 523/207; 523/209; 523/214; 244/121; 244/129.3

(58) Field of Classification Search .................. None
See application file for complete search history.

(56) References Cited

U.S. PATENT DOCUMENTS 3,637,417 A * 1/1972 Green ..................... 427/342
4,749,614 A * 6/1988 Andrews et al. ............ 442/101
5,039,566 A   8/1991 Skubic
5,198,479 A * 3/1993 Shiobara et al. ............ 523/214
5,665,450 A   9/1997 Day
5,730,922 A   3/1998 Babb
5,733,659 A   3/1998 Iwakiri

FOREIGN PATENT DOCUMENTS

EP  1146093   * 10/2001
JP  49023847  *  3/1974
JP  52077154  *  6/1977

OTHER PUBLICATIONS

Day, D.E., "Optically Transparent Composite Development", Final Technical Report (Z10045), Feb. 28, 1992, McDonnell Aircraft Company, St. Louis, Missouri.

* cited by examiner

*Primary Examiner*—David J. Buttner
(74) *Attorney, Agent, or Firm*—Ingrassia Fisher & Lorenz, P.C.

(57) ABSTRACT

An optically clear structural laminate includes a thermosetting resin, a silane coupling agent and a filler. The laminate has a high weight to strength ratio and is capable of optical transmission over a wide range of temperatures. The laminate has increased tensile strength and is capable of being easily formed into complex shaped components. The structural properties of the laminate make it useful as aircraft canopies and windows.

25 Claims, 3 Drawing Sheets

METHODS OF MAKING OPTICALLY CLEAR STRUCTURAL LAMINATES

STATEMENT OF RELATED APPLICATIONS

This application is a divisional application of and claims priority from U.S. Ser. No. 10/259,702 filed Sep. 27, 2002, issued as U.S. Pat. No. 6,818,306.

GOVERNMENT INTERESTS

The invention was made with Government support under a contract awarded by Det 1 AFRL/PKN (−8100), Wright-Patterson AFB OH. The Government has certain rights in this invention.

FIELD OF THE INVENTION

The present invention generally relates to structural laminates and methods for producing the same. More specifically, this invention relates to optically clear structural laminates incorporating filler, such as fiberglass, and an optically clear resin matrix.

BACKGROUND OF THE INVENTION

Transparent materials have been widely used in a variety of articles, including glazing materials for buildings and vehicles, laboratory glassware, packaging, decorative lighting fixtures, safety panels at sports arenas, and architectural panels. Common transparent materials include glass and polymers, such as acrylic and polycarbonate.

Glass may be the most widely used of these materials. Glass is hard, chemically inert in the presence of most other substances, resistant to abrasion, and inexpensive. These qualities make glass useful in many applications. However, glass is also heavy, brittle and difficult to shape into complex forms. Standard sheet glass, for example, may have low tensile properties of about 1,000 psi. These qualities make glass unsuitable for some applications.

Polymers, such as acrylic and polycarbonate, may be lighter in weight, less brittle, and easier to form into complex shapes when compared to glass. Plastics, such as polycarbonate, are more resilient than glass, but they can only produce tensile strengths of about 10,000 psi. Polymers have been used extensively in many industries. For example, poly(methyl methacrylate) has found beneficial use in many products. Unfortunately, polymers may not possess the strength of glass. Materials comprising a combination of glass and polymer have been used in applications where neither material alone is desirable.

Laminate materials comprising layers of glass, acrylic or polycarbonate plastics, or combinations thereof bonded together by interlayers of a polymeric bonding material have been described. A glass/plastic windshield, for example, may comprise a glass face ply laminated to acrylic structural plies by means of polyvinyl butyral (PVB) interlayers. Unfortunately, bond failures, or delaminations, at the interlayer interfaces have been noted. Causes for bond failure may include mechanical or thermal stress, moisture ingress, and bond deterioration.

Other materials comprising a combination of glass and polymer have also been disclosed. A composite structure for use as pipes or storage tanks has been described as fiberglass fibers disposed in layers and impregnated in a resinous binder. To balance and distribute material strength in all directions, fibers of one layer are disposed at an angle relative to the fibers of a second layer. Although containment strength and resistance to delamination is increased, these materials may not be optically clear and may not be suitable for many applications.

A transparent material has been disclosed in U.S. Pat. No. 5,733,659. This molded material comprises a pair of thermoplastic films and a reinforcing resin composition layer interposed between the films. The reinforcing resin composition comprises a thermoplastic resin, such as an aromatic polycarbonate resin, a glass filler and polycaprolactone. The glass filler is in the form of beads, flakes, powder or chopped fiber strands and the filler is uniformly blended into the resin. The amount of glass filler is preferably 5 to 30% (about 2-18% by volume) by weight based on a total weight of the molded product. To produce this transparent material, the thermoplastic films are fitted on the inner surface of an injection mold and then the reinforcing resin composition is melt-injected into the injection mold. Although increasing the amount of glass filler increases the strength of the transparent material, it is also said to considerably deteriorate the optical properties. Additionally, a primer coating treatment may be necessary to promote a thermal fusion between the thermoplastic film and the reinforcing resin composition. Further, these processes may not be suitable when using fabric fillers or unchopped fiber strand fillers.

Other methods of producing transparent composites have been described by Day et al. in "Optically Transparent Composite Development," Final Technical Report (Z10045), McDonnell Aircraft Company, 1992. Although composite strength increased with increasing filler content, this report also noted that optical transmission decreased. The transmission decease was said to be due to the large number of interfaces where transmission losses occurred. By placing fiber fillers where bending stresses are highest, the amount of filler required for a given flexural strength was reduced. Unfortunately, these composites may be transparent only over a narrow temperature range and may not possess the strength needed for some applications.

A laminate formed by polymerizing a monomer while glass fibers are maintained immersed within the monomer has been described in U.S. Pat. No. 5,039,566. These materials are said to be useful as aircraft canopies and aircraft windows. Matching the refractive indices of the glass and polymer minimizes the scattering and reflection of light that normally occurs at the glass/polymer interface. Unfortunately, the described processes require several hours or days and the optical clarity of the resulting material is inadequate for some applications. Further, as the percent glass volume increases, the optical clarity of the material decreases. In one sample, the percent glass volume was 14 and the optical transmission was 43.3%. In a second sample, the percent glass volume was 33 and the optical transmission was about 20%. Although the first sample had higher optical transmission, it also had a modulus of rupture of only 47,796 lbs./in$^2$, while the second sample had a modulus of rupture of about 90,000 lbs./in$^2$. Additionally, these materials may have acceptable optical clarity only when the material is exposed to a narrow range of temperatures and they may be difficult to form into complex shapes. Further, the manufacturing processes provided may not be desirable for many applications and may require secondary installation steps.

Some of the disadvantages of the '566 patent were addressed in U.S. Pat. No. 5,665,450. For these composites, four-sided glass ribbons, as opposed to cylindrical fibers, were embedded in a polymer sheet. The ribbons were arranged in such a way that one planar surface of the ribbon was parallel to the surface of the polymer sheet. This composite sheet was then laminated onto one or both surfaces of a polymer core. By positioning the glass near the surface, the strength of the material was said to increase without also increasing glass volume and without decreasing the optical transmission. The glass volume was preferably between 1% and 25% of the composite volume. Materials containing ribbons were found to have a higher transmission over a wider temperature range than those containing fibers. Unfortunately, optical transmission over still wider temperature ranges is needed. Also, processes that require the careful arrangement of ribbon surfaces parallel to the surface of the polymer sheet may not be preferred when high volume laminate production is desired. Further, it was noted that a higher maximum transmission was observed when using the cylindrical fibers. Additionally, because the composite sheets were laminated onto pre-formed polymer cores, these materials may not be preferred when complex component shapes are desired. Also, the production of these materials may require high pressure. Although, these materials may have improved optical properties when compared to the '566 patent, further increases in laminate strength are needed.

As can be seen, there is a need for improved optically clear structural laminates. Further, there is a need for laminates having improved optical properties without a reduction in percent glass volume. Additionally, there is a need for transparent laminates having decreased weight and increased structural performance. Also, there is a need for laminates having increased tensile strength and modulus (increased stiffness), and increased optical clarity. Further, there is a need for optically clear laminates capable of being easily formed into complex shapes. Moreover, there is a need for laminates having improved optical properties over a range of temperatures without the need for four-sided ribbons.

SUMMARY OF THE INVENTION

In one aspect of the present invention, a laminate capable of optical transmission comprises a thermosetting resin; a filler embedded in the thermosetting resin, wherein the refractive index of the filler is within about–0.010 of the refractive index of the thermosetting resin for a wavelength between about 400 nm and about 750 nm; and a coupling agent in contact with the filler.

In another aspect of the present invention, a laminate capable of optical transmission comprises an epoxy resin; a filler embedded in the epoxy resin, wherein the volume percent of the filler is between about 45% and 65% and the refractive index of the filler is within about 0.010 of the refractive index of the epoxy resin for a wavelength between about 400 nm and about 750 nm; and a silane coupling agent in contact with the said filler.

In still another aspect of the present invention, a structural aircraft laminate capable of optical transmission comprises a thermosetting resin; a filler embedded in the thermosetting resin, wherein the refractive index of the filler is within about 0.010 of the refractive index of the thermosetting resin for a wavelength between about 400 nm and about 750 nm; and a silane coupling agent in contact with the filler, such that the optical transmission varies by less than about 25% over a temperature range from about –10° F. to about 180° F.

In yet another aspect of the present invention, a laminate capable of optical transmission comprises an epoxy resin that is an optically transparent epoxy, selected from the group consisting of EPOTEK301, EPOTEK302-3m, FIBER OPTICS AB9300; a fabric filler embedded in the epoxy resin, wherein the volume percent of the fabric filler is between about 45% and about 65% and the refractive index of the fabric filler is within about 0.010 of the refractive index of the epoxy resin for a wavelength between about 400 nm and about 750 nm: and a silane coupling agent selected from the group consisting of DOW CORNING A-1100, DOW CORNING Z6020, and DOW CORNING Z6040, said silane coupling agent in contact with the fabric filler- and the optical transmission varies by less than about 25% over a temperature range from about –10 degrees F. to about 180 degrees F.

In a further aspect of the present invention, a method of producing a laminate capable of optical transmission comprises the steps of providing a filler coated with a coupling agent; positioning the filler in a mold; impregnating the filler with a heated thermosetting resin; curing the heated thermosetting resin, such that a laminate is formed; and removing the laminate from the mold.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides optically clear laminate materials capable of being processed into shaped components and methods for producing the same. The laminates of the present invention may find beneficial use in many industries including automotive, aviation, architectural, sports, marine, military, civil, space, electronics and medical. The laminates of the present invention may find particular use in aircraft canopies, light covers, filter lenses, architectural materials, and windows.

The laminates of the present invention can comprise an optically clear polymer, a fiberglass filler, and a coupling agent. The index of refraction of the polymer and the filler may match within about 0.010. Unlike the prior art, the polymer of the present invention can be a thermosetting resin and the laminate can be optically clear over a range of temperatures, such that objects may be visible when viewed though the laminate. An "optically clear" laminate is defined herein as a laminate having at least about 80% optical transmission in the visible spectrum at 75° F. Moreover, unlike the prior art, reducing the refraction and distortion caused by the coupling agent may increase the optical clarity of the laminate of the present invention. Improving the optical properties of the laminate does not require a reduction in the percent glass volume of the laminate, which is also unlike the prior art. In the present invention, heating the thermosetting resin prior to transferring the resin to a mold, which is unlike the prior art, can increase the optical properties of the laminate by lowering the viscosity of the resin and providing better wet-out the fiber, thus increasing the strength of the fiber/resin interface. Thermoplastics are heated before molding but generally do have the low viscosity and wetting characteristics of the thermosetting resin. Further, unlike the prior art, increasing the temperature range in which the laminate is optically clear does not require the use of four-sided ribbons.

Figure 1A:
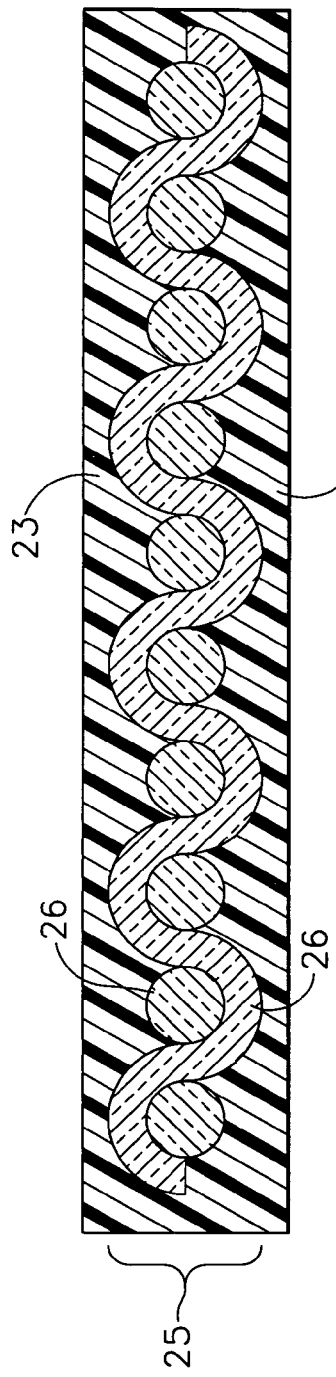
FIG. 1A is a cross sectional diagram of an optically clear structural laminate according to an embodiment of the present invention.
Figure 1B:
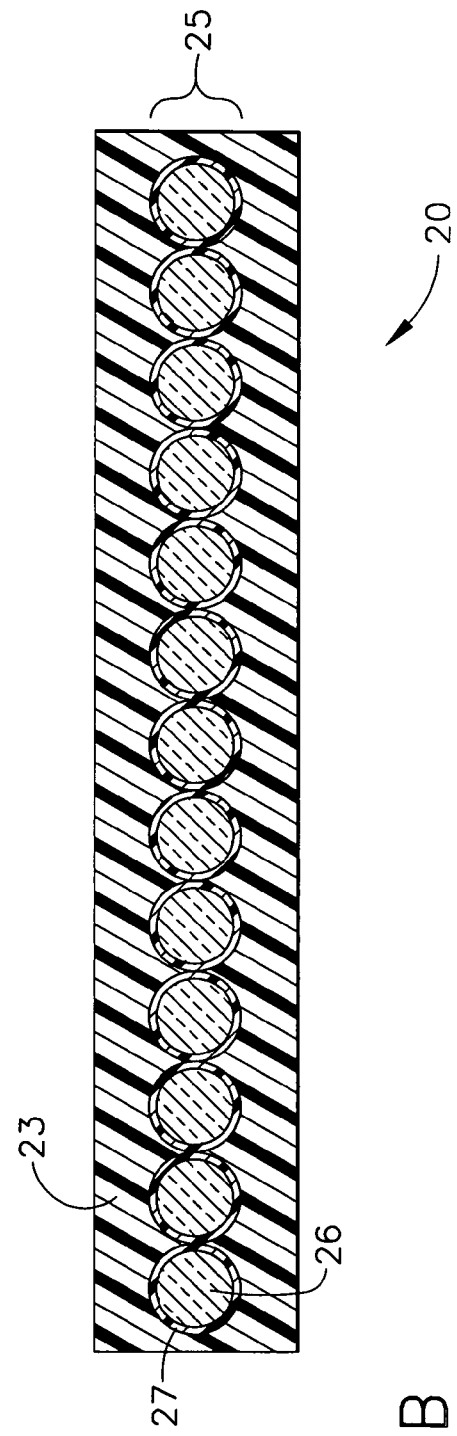
FIG. 1B is a cross sectional diagram of an optically clear structural laminate according to another embodiment of the present invention.

FIGS. 1A and 1B are cross sectional diagrams of optically clear structural laminates 20 according to two embodiments of the present invention. A filler 25 can be fiber strands 26 that are woven, as seen in FIG. 1A. Or a filler 25 can be fiber strands 26 that are unwoven, as seen in FIG. 1B. Other useful fillers 25 can include chopped fibers and solid spheres. The filler 25 can be embedded in a polymer 23. As better seen in FIG. 1B, the filler 25 may be coated with a coupling agent 27.

Polymers 23 useful in the present invention may include thermosetting resins. Thermoplastics may be softened and reformed into different shapes by heating, whereas thermosetting resins may not. As temperature increases, laminates comprising thermoplastics may weaken and warp. The strength of thermoplastic laminates may be more dependent on temperature when compared to the strength of thermosetting resin laminates. The thermosetting resins may have a three-dimensional molecular structure that provides a crosslinking feature as opposed to the linear molecular structure commonly found in thermoplastics. Some thermoplastics, such as poly (methyl methacrylate), do have three-dimensional molecular structures; however, dipole-dipole forces as opposed to covalent bonds in thermosetting resins may hold their molecules together. Due to their molecular structure, materials comprising thermoplastics may have a more pronounced decrease in modulus of elasticity than materials comprising thermosetting resins. Examples of thermosetting resin advantages may include greater strength and stiffness, relatively low cost compared with high performance thermoplastics, high long-term heat resistance and high heat distortion temperatures, excellent dimensional stability, and low predictable mould shrinkage which permits thick and thin sections together in one part and prevents warping and sink marks. Most thermosets may be harder than thermoplastics and therefore more scratch and abrasion resistant. Thermosets may have low flammability characteristics. Thermosets do no melt. The low viscosity nature of the selected thermosets may wet out the fiber better than a thermoplastic resin can for a high volume percent (45-65%) loading of fiber within a mold. Lower processing temperatures and pressures may be used with thermosets.

Known processes for producing transparent laminates may comprise forming a filler/polymer pre-preg layer and hot-pressing the pre-preg layer onto a polymer sheet. These processes may not be useful when the polymer is a thermosetting polymer because the hot-pressing must be at a temperature at or above the glass transition temperature of the polymer and the processes require a polymer flow sufficient to consolidate the pre-preg layers but insufficient to cause the fillers to lose their alignment. Misalignment may not be a problem with woven materials. Polymer flow occurs when the polymer molecules move in relation to one another. The heat or energy required to break the covalent bonds holding the thermosetting polymer molecules together may also break the bonds holding the atoms of the molecule together. Processes that result in the bond breakage within the polymer molecule may not be desirable.

Useful polymers 23 may include phenol-formaldehyde, urea-formaldehyde, melamine-formaldehyde,—polyester resins, and epoxy resins. Melamine resins may be resistant to the influence of light and useful with inorganic fillers. Polyester resins and epoxy resins may be colorless and useful with inorganic fillers. Epoxy resins may have better chemical resistance than polyester resins. Epoxy resin laminates may have greater tensile, flexural and impact strength than—polyester resin laminates. On the other hand, phenol resins may turn brown under the influence of light. Urea resins may be colorless and resistant to light; however, they may have a low thermal stability, and they may not be suitable for use with inorganic fillers.

Preferred polymers 23 of the present invention include epoxy resins. Epoxy resins may be formed by the base-catalyzed reaction between an epoxide, such as epichlorohydin, and a polyhydroxy compound, such as bisphenol A. This reaction may yield a prepolymer by an initial base-catalyzed ring cleavage of the epoxide ring by hydroxyl groups. The resulting product may contain both terminal epoxy groups and pendant hydroxyl groups. The addition of reagents, such as amines, may then result in the crosslinking of the prepolymer. Epoxy resins may be characterized more by ring cleavage and condensation than by simple ring-opening polymerization. Useful epoxy resins may include bisphenol—A diglycidyl ester, bisphenol glycidyl ether, novolac resin glycidyl ether and aliphatic polyepoxide. Preferred epoxy resins include The Bisphenol A and F family. Bisphenol F may be preferred for higher temperature applications. More preferred thermosetting resins include EPOTEK 301, EPOTEK302-3M, and Fiber Optic's AB9300. EPOTEK 301 and EPOTEK302-3M are available from Epoxy technology in Billercia, Mass. ANGSTROM-BOND AB9300 epoxy resin is available from Fiber Optics Center in New Bedford, Mass.

Hardening agents, such as thiocol rubber and polyamide hardener, may be included in the polymer resins of the present invention to solidify, or cure, the resins. The thermosetting resin may also be cured without the addition of a hardening agent. Useful hardening agents, also referred to as curing agents, may include aromatic polyamines, polyamides, aliphatic polyamines, polyacids and polyanhydrides. Preferred hardening agents include the Polyamine family. Solidifying, or curing, an epoxy resin may be at room temperature or higher temperatures. Preferred curing temperatures may be between about 75° F. and about 350° F. A more preferred curing temperature may be between about 250° F. and about 300° F. The curing rate may be adjusted by the choice of hardening agent and curing temperature.

According to the present invention, fillers 25, such as fibers and fabric, may be added to the polymer 23. A useful volume percent of filler 25 may be between about 45% and about 65% of the volume of the laminate. Fabric fillers may be woven or unwoven. Other filler shapes, such as chopped fibers and solid spheres, are known in the art, and may be useful in the present invention. Methods for producing these fillers are also known in the art. Methods for producing useful glass fillers are described in U.S. Pat. No. 5,665,450 and which is herein incorporated by reference.

The fillers 25 may carry more of an externally provided load than the polymer 23. The polymer 23 may serve to transfer stresses from an external source, such as an impact force, to the fillers 25 and to protect the fillers 25 against damage. For example, the polymer 23 may be more resilient than the filler 25 and may cover the filler 25, such that abrasions and breakage of the filler 25 caused by external source impacts may be prevented.

The structural properties of the laminate 20 may depend on the orientation of the filler 25 within the laminate 20. For example, fillers 25, such as fiber strands 26, may be disposed in a unidirectional or cross-ply manner within the laminate 20 such that the tensile strength of unidirectional laminates and quasi-isotropic laminates may be increased or orientated in desired locations within the laminate. The altering of filler orientation to alter the structural properties of the laminate may be useful in some applications of the present invention. For example, when the laminate 20 is an automobile windshield, fiber strands 26 disposed cross-ply may be preferred to fiber strands 26 disposed unidirectional.

Figure 3:
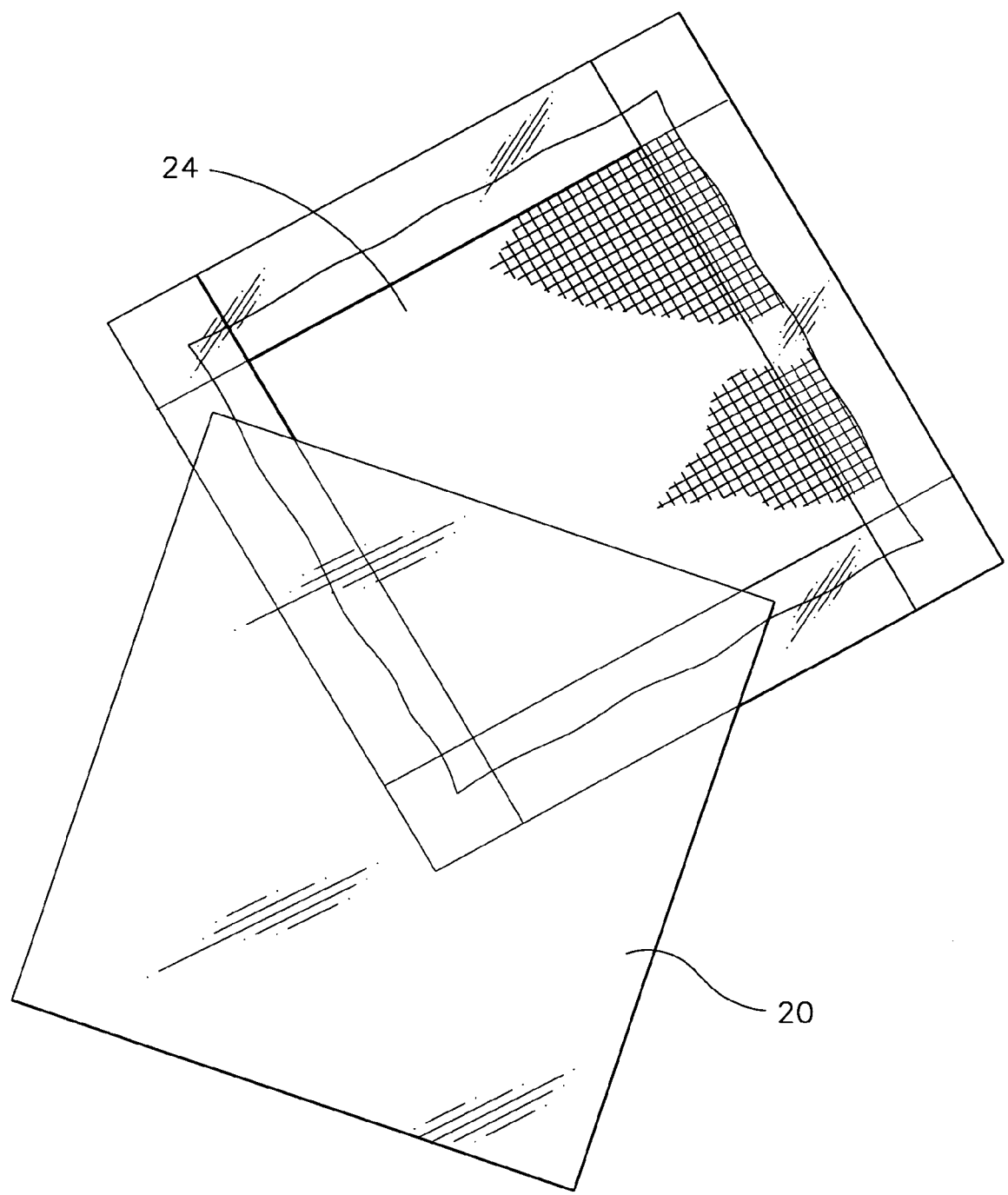
FIG. 3 is a photograph of a fiberglass fabric filler without resin and an optically clear laminate according to an embodiment of the present invention.

Incomplete polymer 23 penetration into a filler 25, such as a fiberglass fabric 24 shown in FIG. 3, may reduce optical clarity. Incomplete polymer penetration is polymer penetration that results in a laminate 20 having at least a portion of filler 25 exposed to air. Because the polymer 23 may not completely penetrate fabric fillers thicker than about 0.020", thinner fabrics may be preferred. Useful fillers 25 may be fabrics between about 0.002" and about 0.020" in thickness. Preferred fabric fillers may be between about 0.002" and about 0.010" in thickness. One useful fabric may be 108 style fabric available from the Hexcel Corporation in California. This fiberglass fabric may be 0.0025" thick. Other types of fabric that may be useful are also available from the Hexcel Corporation. These include 120 and 7781 style fabric with thicknesses of 0.005" and 0.010", respectively. Increasing the volume percent of the filler 25 may increase the structural properties, such as rigidity, of the laminate 20. A useful volume percent of filler may be between about 45% and about 65%. A preferred volume percent of filler may be between about 60% and about 62%.

Useful fillers 25 may include glass and quartz. Glass fillers may be composed of mainly silicon dioxide materials. Useful glasses may include, but are not limited to, type A glass, type E glass, type C glass, type D glass, types S glass and type R glass. Type A glass may be an alkali glass also referred to as soda lime glass and may commonly be used in windows and bottles. Type E glass may be a boroaluminosilicate glass and may commonly be used in reinforced plastics. Type C glass may be a calcium aluminosilicate glass and type D glass may be a lower density glass. Type R and S glasses may be high-strength glasses. Each glass type has different volume fractions of silicon dioxide with other additional various oxide components. The silicon dioxide percent can vary from 50 to 75%, giving each type of glass a different index of refraction value. Even within the same type of glass, such as E-glass, the index refraction of the base material can vary from vendor to vendor, so it is important to match the index of refraction of the resin with a particular manufacturer.

Preferred glass fillers include optical glasses. Optical glasses may have higher transmission than normal window glasses. Optical glasses, such as flint glasses and crown glasses, may be available from Chance Bros and Co. Ltd in England, Parra Mantois et Cie in France, Schott und Genossen in Germany, Bausch and Lomb Optical Co. in the U.S.A., and Corning Glassworks in the U.S.A. Catalogues of optical glasses may give the refractive indices at various wavelengths corresponding to certain spectral lines.

The refractive index of the polymer 23 may be matched to the refractive index of the filler 25. A preferred difference in the refractive indices at about 72° F. may be less than about 0.010 for a wavelength between about 400 nm and about 750 nm. The refractive index of a material may be a function of the temperature of the material. The amount of change in refractive index due to change in temperature may be a function of the composition of the material. For example, two different materials may have the same refractive index at one temperature and different refractive indices at another temperature. For a preferred laminate 20, the filler 25 and polymer 23 may be matched in both index of refraction vs. wavelength and in temperature coefficients of refractive index. The wavelength of maximum transmission through a material may also be a function of temperature. For example, the wavelength of maximum transmission may be 800 nm at one temperature and 400 nm at another temperature. The refractive index of the polymer 23 may be matched to within about 0.010 of the refractive index of the filler 25 over a range of temperatures. The difference between the refractive index of the filler 25 and the refractive index of the polymer 23 may be between about 0.001 and about 0.010. A useful range of temperatures may be about −65° F. to 350° F. A preferred range of temperatures may be from about −40 F° F to about 250° F. A more preferred range of temperatures may be from about −10° F. to about 180° F. The optical transmission within the preferred temperature range may vary by less than about 25%.

The properties of the laminate 20 may also be tailored to provide thermochromic characteristics for creating a product that can change colors with altering temperature. For example, to produce a laminate 20 that changes color with changing temperature, the refractive indices of the polymer 23 and filler 25 may be matched closely within 0.005 to produce a clear laminate at room temperature, however if the resin and filler have different temperature coefficients of refractive index, this can produce a laminate that changes color in either the hot or cold condition. As an example, this type of laminate could be used as a visual tool in determining temperature gradients in thermal applications.

A coupling agent 27, such as a silane, may be applied to the fillers 25 to enhance bonding between the filler 25 and the polymer 23. This enhanced bonding may improve the structural properties, such as tensile strength and (modulus) rigidity, and optical properties, such as transmission, of the laminate 20. This may be because air pockets may be less likely to form around the fillers 25. These air pockets may reduce stress transference to the fillers 25 and decrease optical clarity of the laminate 20. Silanes may provide superior adhesion between the fiberglass and resin matrix. The silane also may improve heat and moisture resistance, mechanical properties, weatherability, and solvent resistance of the laminate 20. Additionally, the silane may improve wetting of the filler 25. Useful coupling agents 27 may include silane.

Silanes, such as methacryloxypropyltrimethoxy-silane and vinyltriethoxysilane, may comprise two functionalities bound to the same silicon atom. One functionality may be a nonhydrolyzable organic radical capable of interacting with polymers. The other functionally may be a hydrolyzable group. The hydrolyzable product, silanol, may be capable of reacting with inorganic substrates, such as glass. Preferred coupling agents 27 may include SILQUEST A-1100 (gamma-aminopropyltriethoxysilane), DOW CORNING Z6020 (aminoethylaminopropyltrimethoxy silane) and DOW CORNING Z6040 (3-glycidoxypropyltrimethoxysilane).

The coupling agents 27, such as silane, may also cause light refraction and visual distortion in the laminate 20. Useful coupling agents 27 may depend on the composition of the polymer 23 and the composition of the filler 25. The selection of the coupling agent 27 may be based not only on its bonding properties within the laminate 20 but also on its distortion and refractive properties within the laminate 20. For example, when using Epotek 301 epoxy resin and E-glass, a coupling agent 27 comprising 3-glycidoxypropyltrimethoxysilane may be useful. When an alternate coupling agent, such as aminoethylaminopropyltrimethoxysilane, is selected for this laminate 20, the coupling agent 27 may have about equivalent bonding properties; however, the optical properties of the laminate 20 may decrease due to a wider differential in refraction and distortion by the difference in index of refraction between the silane (1.43) and the resin/fiberglass (1.54) materials.

The coupling agent 27 may be applied before and/or after the fibers strands 26 are formed into a fabric. The coupling agent 27 may be applied to the fillers 25 during or after the manufacture of the filler 25. Methods for applying a coupling agent 27 to a filler 25 are known in the art. Useful methods may include dipping, extrusion, casting, reaction injection molding, painting, washing, spraying, and others. The coupling agent 27 may be applied to the filler 25 such that a filler 25 coated with coupling agent 27 is produced. A useful thickness of the applied coupling agent 27 may be between about 50 angstroms and about 500 angstroms. A preferred thickness may be between about 50 angstroms and about 100 angstroms (5-10 monolayers). Since it is very difficult to measure the silane thickness, manufacturers apply the coating thickness of silane to fiberglass as a function of percent solids of silane in a solution. The preferred weight percent of silane in a solution is between 0.07% and 0.30% per gram of fiber based on a fiberglass surface area of $m^2$/gram. A more preferred weight percent of silane in a solution is 0.07% to 0.10%. When a hazy finish is noticeable on the fiberglass surface it means too much silane has been applied. Due to the difference in refractive index between the fiberglass (1.54) and silane (1.43), a minimal coating is desirable to minimize the light scattering effects between the resin and fiberglass.

The laminate 20 of the present invention may be optically clear over a range of temperatures. They may also have increased unidirectional and quasi-isotropic tensile strength. The tensile strength of the unidirectional laminates of the present invention may be between about 50 kpsi and about 85 kpsi. Preferred unidirectional laminates may have a tensile strength of at least about 50 kpsi. The tensile strength of the quasi-isotropic laminates of the present invention may be between about 30 kpsi and about 55 kpsi. Preferred quasi-isotropic laminates may have a tensile strength of at least about 30 kpsi. Laminates 20 of the present invention may have a thickness of about 0.002" to about 0.150". Preferred thicknesses are between about 0.005" and about 0.100". More preferred thicknesses are between about 0.010" and about 0.060".

Figure 2:
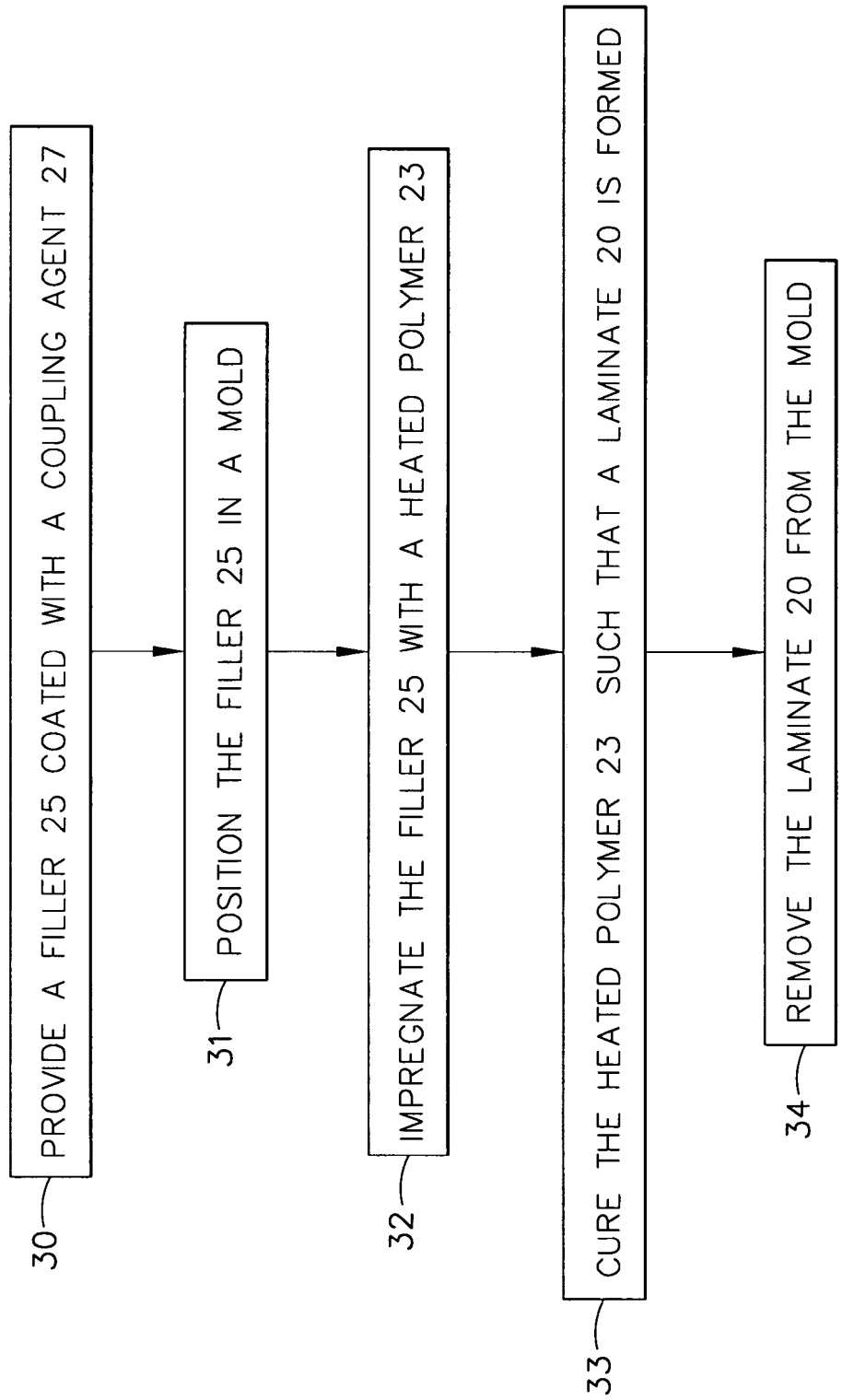
FIG. 2 is a flow diagram depicting the steps according to a process of the present invention.

The steps according to a process of the present invention are depicted in FIG. 2. The process may comprise a step 30 of providing a filler 25 coated with a coupling agent 27 a step 31 of positioning the filler 25 in a mold, a step 32 of impregnating the filler 25 with a heated polymer 23, a step 33 of curing the heated polymer 23 such that a laminate 20 is formed, and a step 34 of removing the laminate 20 from the mold.

The filler 25 coated with a coupling agent 27 of step 30 may comprise a fiberglass fabric coated with a silane. This fabric may then be placed in a mold. Molds for use with thermosetting resins may be divided into two groups—compression molds and resin transfer molds. With compression molds, the polymer 23 may be placed in the open mold. A product may be shaped by pressure build up as the mold is closed. With resin transfer molds, the polymer 23 may be placed in a chamber outside the closed mold. There may be a gate connecting the chamber to the mold. The polymer 23 may be forced, as by a hydraulic plunger, air pressure, a vacuum, or by a combination of all three, through the gate and into the closed mold. Resin transfer molds may be preferred for shaping products with delicate or thin areas. This may be because the areas of the mold corresponding to the delicate or thin areas of the product may experience less force than when using a compression molding system. Molds used in the present invention may comprise resin transfer molds and may be used to form laminates having complex shapes, such as aircraft canopies, curved windows, aircraft windshields, gauge covers, and light covers. Useful Resin Transfer Mold (RTM) processes are described in U.S. Pat. No. 5,730,922, and which is herein incorporated by reference. Releasing layers, such as Teflon film, used in RTM processes are also known in the art and may be useful in the present invention. Functional layers, such as anti-fogging, radiation-shielding, hard coat, anti-reflective and anti-static, are also known in the art and may be useful in the present invention.

A step 32 of impregnating the filler 25 may comprise a vacuum. As is known in the art, polymer 23 may be transferred through a gate into a mold during RTM processes. The polymer 23 may be transferred by any suitable means, such as hydraulic or mechanical plunger. For the present invention, the preferred means of transferring the polymer 23 may be by vacuum. A vacuum may be created in the mold. This vacuum may then draw the polymer 23 through a gate and into the mold such that the filler 25 becomes impregnated with the polymer 23 and entrapped air within the fiber bundles is removed.

The polymer 23 may be heated and degassed prior to being transferred into the mold. A heated polymer 23 may have a lower viscosity than an unheated polymer 23. A lower viscosity polymer 23 may be capable of increased wetting and penetration of the filler 25. The increased wetting and penetration may improve the structural and optical properties of the laminate 20. A useful temperature to which the polymer 23 is heated may vary depending on the composition of the polymer 23 and the dimensions of the filler 25. The polymers 23 of the present invention may be heated to a temperature high enough to lower the viscosity of the polymer and low enough to prevent the polymer from exotherming. For example, when using FIBER OPTICS AB9300 epoxy resin and 35 plies of 108 style fiberglass cloth filler, a temperature of about 150° F. may be preferred. Prior to impregnating the filler 25, the polymers 23 of the present invention may be heated to a temperature between about 140° F. and about 160° F. The polymers 23 may also be degassed prior to impregnating the filler 25. Degassing techniques are known in the art and may comprise a vacuum system utilizing a minimum of 28 inches of mercury. The degassing may reduce the volume of air in the polymer 23 such that the mechanical and optical properties of the laminate 20 are improved.

The step 33 of curing the heated polymer 23 such that a laminate 20 is formed and the step 34 of removing the laminate 20 from the mold are known in the art. The step 33 of curing may include increasing the temperature or pressure of the polymer 23. When the laminate 20 comprises one or more functional layers, the functional layer may be co-cured with the polymer 23. For example, an ultraviolet protection film may be placed as the outside layer in the laminate and co-cured with epoxy resin. Preferred layers include diffusion, anti-reflection, and ultraviolet protection layers and they may be co-cured with the polymer 23. Any curing and removing methods known in the art may be useful in the present invention.

EXAMPLE 1

An optically clear structural laminate was produced according to an embodiment of the present invention. A fiberglass fabric 24, as seen in FIG. 3, was produced from the Hexcel Corporation in California. The fiberglass used was 108 style fabric 24 and was 0.0025" thick. The fabric 24 had a refractive index of 1.550. The coupling agent was already applied to the fabric by the vendor. The coated fabric was then placed in the RTM mold. A 100 gram sample of ANGSTROMBOND AB9300 epoxy resin available from Fiber Optics Center in New Bedford, Mass. was degassed for 10 minutes in a bell jar using 28 inches of mercury and heated to a temperature of 150 degrees F. for 20 minutes. The polymer 23 had a refractive index of 1.548 at 589 nm. The heated polymer was then transferred to the mold by vacuum. The polymer impregnated fabric was then cured for 16 hours at 150 degrees F. and postcured at 250 degrees F. for 3 hours such that a laminate 20 was produced.

Other laminates 20 of the present invention may comprise resins such as EPOTEK301 resin from Epoxy Technology in Billerica, Mass. and may be processed at room temperature and later postcured at higher temperatures. The laminate 20 in FIG. 3 was processed using the RTM method at room temperature using EPOTEK301 resin. The laminate 20 was optically clear over a temperature range from −10 degrees F. to 180 degrees F. and had a thickness of 0.065". The fiberglass/301 resin laminates may provide an optical transmission of about 96%, 91% and 86% for laminate thickness of 0.005", 0.030", and 0.0065", respectively. For comparison, an industry standard Fiberglass or quartz laminate with epoxy at 0.065" has less than 10% transmission.

As can be appreciated by those skilled in the art, the present invention provides improved optically clear structural laminates and methods for their production. Also provided are transparent laminates that are easily formed into complex shapes such as aircraft canopies, aircraft windshields, gauge covers, and light covers. Further, the present invention provides structural laminates with optical clarity over a wide range of temperatures, such as a range of about −10° F. to about 180° F. As can be appreciated by those skilled in the art, laminates are provided that may be co-cured with other materials, such as anti-reflective layers and radiation-shielding layers, thereby eliminating the costs associated with secondary installation steps in some applications. Outside mold surfaces may be modified or textured to provide diffusion characteristics in the laminate surface. Additionally, a laminate comprising polymer and glass fiber is provided, wherein the temperature range for optical transmission is increased without the need for glass ribbons. Moreover, the modulus of this structural laminate is much greater than the thermoplastics with chopped fiberglass strands. Also provided is an optically clear structural laminate that has a tensile strength of at least about 30 kpsi for an isotropic laminate and 50 kpsi for a unidirectional laminate.

It should be understood, of course, that the foregoing relates to preferred embodiments of the invention and that modifications may be made without departing from the spirit and scope of the invention as set forth in the following claims.

We claim:

1. A method of producing a laminate having a property of optical transmission, the method comprising the steps of:
   providing a filler coated with a coupling agent, the filler having a first refractive index, the filler comprising at least one of fibers, chopped fibers, woven fibers, unwoven fibers, or woven fabric;
   positioning said filler in a mold;
   impregnating said filler with a heated thermosetting resin, the thermosetting resin having a second refractive index, a difference between the second refractive index and the first refractive index within about 0.010 in a wavelength between about 400 nm and about 750 nm;
   co-curing said heated thermosetting resin with a functional layer; and
   removing said laminate having a property of optical transmission from said mold.

2. The method of claim 1, wherein said heated thermosetting resin comprises a heated epoxy resin.

3. The method of claim 2, wherein said heated epoxy resin comprises at least one of Bisphenol A and Bisphenol F.

4. The method of claim 1, wherein said laminate having a property of optical transmission is a unidirectional laminate having a tensile strength of at least about 50 kpsi.

5. The method of claim 1, wherein said filler comprises a fabric filler having a thickness between about 0.002" and about 0.010".

6. The method of claim 1, wherein the step of removing, comprises removing a composite having a property of optical transmission that varies by less than about 25% over a temperature range from about minus 10° F. to about 180° F.

7. The method of claim 1, wherein in the step of impregnating, said heated thermosetting resin is at a temperature between about 140° F. to about 160° F.

8. The method of claim 1, wherein said laminate comprises an aircraft component selected from the group consisting of aircraft canopy, aircraft windshield, gauge cover, and light cover.

9. The method of claim 1, wherein said functional layer comprises any one of an ultraviolet light-shielding layer, an anti-reflective layer, a protective hard layer, an anti-static layer, an anti-fogging layer, a diffusion layer, a polytetrafluoroethylene layer and a radiation-shielding layer.

10. A method of forming a structural window, comprising the operations of:
    providing an epoxy resin having an index of refraction;
    providing a functional layer;
    coating a filler with the epoxy resin, the filler having an index of refraction and the filler comprising at least one of fibers, chopped fibers, woven fibers, unwoven fibers or woven fabric, with a coupling agent, the coupling agent having a coupling component for covalently bonding the coupling agent with the epoxy resin;
    supplying the epoxy resin with a sufficient amount of the coated filler to provide structural strength to the structural window when the epoxy resin and the filler are cured to form the structural window; and
    consolidating the epoxy resin and the functional layer to form a structural window;
    wherein the index of refraction of the resin and the index of refraction of filler are matched so that the structural window transmits at least about 80% of incident light in the visible spectrum at 75° F.

11. The method of claim 10 wherein said coupling agent includes an alkoxysilane.

12. The method of claim 10 wherein said coupling component of said coupling agent includes at least one of an amine or an epoxide.

13. The method of claim 12 wherein said coupling agent includes at least one coupling component selected from the group consisting of: 3-glycidoxyalkyl, aminoalkyl, and aminoethylaminoalkyl.

14. The method of claim 10 wherein said reinforcing operation comprises providing filler in at least 45% of the volume of the structural window.

15. The method of claim 10 wherein said reinforcing operation comprises providing said filler including at least one ply of fabric.

16. The method of claim 15 wherein said fabric is woven.

17. The method of claim 10, wherein the functional layer comprises any one of an ultraviolet light-shielding layer, an anti-reflective layer, a protective hard layer, an anti-static layer, an anti-fogging layer, a diffusion layer, a polytetrafluoroethylene layer and a radiation-shielding layer.

18. The method of claim 10, wherein the operation of consolidating comprises co-curing of the plurality of resin-coated layers and the functional layer.

19. The method of claim 10, wherein the operation of consolidating comprises co-curing the plurality of stacked layers.

20. A method of forming a structural laminate window, comprising the operations of:
    coating a resin-impregnated a filler fabric layer, the filler fabric layer comprising at least one of fibers, chopped fibers, woven fibers, unwoven fibers or woven fabric, with a coupling agent, said coupling agent covalently bonding the coupling agent with the resin;
    stacking said plurality of resin-impregnated filler fabric layers;
    applying a functional layer as an upper-most or lowermost layer of the stacked plurality of filler fabric layers; and
    consolidating said plurality of stacked filler fabric layers and said functional layer to form the structural laminate window;
    wherein an index of refraction of the resin and an index of refraction of filler of the filler fabric layers are matched so that the structural laminate window transmits at least about 80% of incident light in the visible spectrum at 75° F.

21. The method of claim 20 wherein the filler fabric comprises fiberglass fabric and the coating operation comprises coating with a silane.

22. The method of claim 20 wherein the operation of consolidating comprises co-curing of the plurality of resin-coated layers and the functional layer.

23. The method of claim 22 wherein said co-curing operation is performed in an autoclave at a temperature exceeding 150° F.

24. The method of claim 20, wherein the operation of consolidating comprises co-curing the plurality of stacked resin-impregnated filler fabric layers.

25. The method of claim 20, wherein the functional layer comprises any one of an ultraviolet light-shielding layer, an anti-reflective layer, a protective hard layer, an anti-static layer, an anti-fogging layer, a diffusion layer, a polytetrafluoroethylene layer and a radiation-shielding layer.

* * * * *